(12) United States Patent
Miller et al.

(10) Patent No.: US 7,425,207 B2
(45) Date of Patent: Sep. 16, 2008

(54) VIAL FOR FILLING A SYRINGE

(75) Inventors: Shawn W. Miller, Columbia, SC (US); David Rocheleau, Lexington, SC (US); Mohammad R. Sadeghi, Columbia, SC (US); Walter Zahn, Columbia, SC (US); Bernd Hansen, Laufen (DE)

(73) Assignee: Holopack International Corp., Columbia, SC (US)

( * ) Notice: Subject to any disclaimer, the term of this patent is extended or adjusted under 35 U.S.C. 154(b) by 0 days.

(21) Appl. No.: 11/151,503

(22) Filed: Jun. 13, 2005

(65) Prior Publication Data

US 2006/0175279 A1   Aug. 10, 2006

Related U.S. Application Data

(63) Continuation of application No. 11/133,710, filed on May 20, 2005, which is a continuation-in-part of application No. 29/220,198, filed on Dec. 28, 2004, now abandoned.

(51) Int. Cl.
*A61B 19/00* (2006.01)
*A61M 5/19* (2006.01)
*A61M 37/00* (2006.01)
*B65D 25/00* (2006.01)
*B65D 83/10* (2006.01)

(52) U.S. Cl. .................. 604/403; 604/404; 604/410; 604/411; 604/82; 604/83; 604/84; 604/85; 220/62; 220/580; 206/363; 206/364

(58) Field of Classification Search ......... 604/403–416, 604/82–92, 212, 216, 77; 200/209; 220/62.22, 220/62, 580; 206/363, 364; 222/158, 209–215, 222/95, 107, 541.6, 541.9; 141/25–27
See application file for complete search history.

(56) References Cited

U.S. PATENT DOCUMENTS

| | | | |
|---|---|---|---|
| 442,696 A | 12/1890 | Thompson | |
| 3,356,244 A | 12/1967 | Witchell | 215/32 |
| 3,993,223 A | 11/1976 | Welker, III et al. | 222/107 |
| 4,207,990 A | 6/1980 | Weiler et al. | 220/267 |
| 4,248,227 A | 2/1981 | Thomas | 128/232 |

(Continued)

OTHER PUBLICATIONS

Patent Cooperation Treaty, ISA/US, PCT International Search Report and Written Opinion, completion date Apr. 14, 2006, mailing date May 11, 2006 , PCT/US05/42576.

*Primary Examiner*—T. Zalukaeva
*Assistant Examiner*—Phil Wiest
(74) *Attorney, Agent, or Firm*—Nelson Mullins Riley & Scarborough, LLP (57) ABSTRACT

A vial for dispensing a liquid into a syringe is described which comprises a body section for holding the liquid, the body section having a top and a bottom; a port having a removable seal, where the port is adapted for a syringe connection and where the port is interconnected with the body section at a point near the top of the body section by a passageway which for at least a portion of its length extends above the level of the liquid in the body section when the vial is inverted, thereby preventing leakage of the liquid from the body section when the seal of the port is removed. A method of making the vial is also described.

23 Claims, 8 Drawing Sheets

U.S. PATENT DOCUMENTS

| | | | |
|---|---|---|---|
| 4,298,045 A | 11/1981 | Weiler et al. | 150/0.5 |
| 4,411,656 A | 10/1983 | Cornett, III | 604/212 |
| D282,348 S | 1/1986 | Federighi | D9/341 |
| 4,834,152 A | 5/1989 | Howson et al. | 141/286 |
| 4,966,312 A * | 10/1990 | Waring | 222/209 |
| 5,035,689 A | 7/1991 | Schroeder | 604/234 |
| 5,114,421 A * | 5/1992 | Polak | 604/403 |
| 5,158,192 A | 10/1992 | Lataix | 215/32 |
| 5,409,125 A | 4/1995 | Kimber et al. | 215/32 |
| 5,520,677 A * | 5/1996 | Hansen | 604/403 |
| 5,817,082 A | 10/1998 | Niedospial, Jr. et al. | 604/414 |
| 5,902,298 A | 5/1999 | Niedospial, Jr. et al. | 604/414 |
| 5,908,124 A | 6/1999 | Klauke et al. | 215/48 |
| 6,173,852 B1 | 1/2001 | Browne | 215/247 |
| 6,283,320 B1 | 9/2001 | Patch | 220/88.1 |
| 6,308,747 B1 * | 10/2001 | Farris | 141/25 |
| 6,626,308 B2 | 9/2003 | Weiler | 215/48 |
| 6,860,405 B1 * | 3/2005 | Poynter | 222/23 |

* cited by examiner

VIAL FOR FILLING A SYRINGE

CROSS-REFERENCE TO RELATED APPLICATIONS

The present application is a continuation application of U.S. Non-Provisional Patent Application Ser. No. 11/133,710, filed May 20, 2005, which was a continuation-in-part of U.S. Design Patent Application Ser. No. 29/220,198, filed Dec. 28, 2004, each of which is incorporated herein by reference in its entirety, and claims priority based on those applications.

BACKGROUND OF THE INVENTION (1) Field of the Invention

The present invention relates to a vial to contain a liquid and from which a syringe can be filled, and more particularly to such a vial whereby a needle is not required for filling the syringe.

(2) Description of the Related Art

Traditionally, drugs in liquid form, such as those to be used for subcutaneous injection, are distributed to the user in premeasured amounts and concentrations in glass or plastic vials having crimped metal seals that secure a rubber septum over the opening of the vial. The sterility or microbial integrity of the liquid contents of the vial is maintained as long as the seal remains in place and the septum is not penetrated by a non-sterile object.

In order to use the medication, a needle is affixed to a syringe, the plunger of the syringe is withdrawn to a volume that is roughly equivalent to the volume of the liquid that is desired to be transferred to the syringe, the needle is used to pierce the septum, the vial is inverted to place the liquid contents in contact with the needle and the septum, the plunger of the syringe is depressed to inject air into the vial—thus creating a positive pressure in the vial—and then the plunger is again withdrawn while keeping the point of the needle submerged in the liquid, to draw the desired volume of liquid into the barrel of the syringe. Withdrawal of this volume of liquid equalizes pressure within the vial. The needle is then withdrawn from the septum, which re-seals, and the desired subcutaneous injection, or other disposition of the liquid, can take place. If it is desired to maintain a sterile transfer of the liquid, as is true for the injection of medications into living subjects, the needle and the syringe are pre-sterilized.

The septum-sealed vial, as described above, has been in use for many years and has many advantages. However, some drawbacks to the use of this type of system remain, and one is the requirement of the use of a needle in filling the syringe. If the needle that is used to penetrate the septum is either damaged, dulled, or contaminated significantly during the syringe loading process, it must be removed from the syringe and replaced with a new sterile needle. This is not only dangerous to the user, but wasteful of needles. Moreover, the necessity of injecting non-sterile air into the vial—often bubbling it directly through the liquid—in order to insure pressure equalization, compromises the sterility or microbial integrity of the liquid that is withdrawn into the syringe, but more importantly, inoculates any liquid that remains in the vial. If the remaining liquid is not used immediately, growth of microbes that were contained in the initial air injection can quickly spoil the remaining drug.

Various efforts have been made to overcome some of the disadvantages of the vial and septum system. In U.S. Pat. No. 5,035,689, for example, Schroeder described a vial of liquid having a luer-loc flange at its opening that could be attached to a syringe (also having a luer-loc fitting) without the use of a needle. Kimber, in U.S. Pat. No. 5,409,125, described a unit dose container that could engage a "luer lock" syringe fitting when a non-resealable cap was removed by breaking a seal. This device also avoided the use of a needle for filling a syringe.

A different approach was described by Niedospial et al. in U.S. Pat. No. 5,817,082, in which a disposable closure assembly/container was provided that included a normal cap and septum vial, but added an integral spike that could be connected with a luer connector on a syringe to penetrate the septum and permit filling of the syringe. In similar fashion, Browne, in U.S. Pat. No. 6,173,852, described a container comprising a closure system having a septum and an integral spike that penetrated the septum upon rotation of the cap. A Luer connector was provided on the cap to permit filling a syringe without the use of a needle.

Containers that were useful for liquid medications were also designed that had easily openable caps. U.S. Pat. No. Des. 282,348 showed a series of plastic vials having breakable seals, and U.S. Pat. No. 3,356,244 to Witchell, showed a similar feature for a single container. Likewise, U.S. Pat. No. 3,993,223 to Welker et al. described a sealed dispensing container for liquid medicaments having a breakable seal. The container could be flattened by manual force, thereby expelling the contents for use. None of these, however, appeared to be useful for filling a syringe.

In U.S. Pat. No. 4,207,990, Weiler, et al. described a hermetically sealed container having plural access ports, one of which was a twist-off cap, which could be removed to admit a draining spike, the other being a severable dome that could be removed to provide a larger opening. Weiler et al., described another dispensing containing having removable closures in U.S. Pat. No. 4,298,045. There, the dispensing container had a plurality of access apertures of controlled internal and/or external dimensions that were sealed by means of removable closures.

Klauke et al., in U.S. Pat. No. 5,908,124, describe a blow-molded collapsible plastic squeeze tube that is sealed with a twist-off tab. A hermetically sealed container having a dispensing nozzle that is opened with a twist-off tab is described by Weiler in U.S. Pat. No. 6,626,308. This device could also be manufactured by blow-molding.

Despite the many innovations that have been made in the present area, several problems still remain. It would be useful to provide a vial or container that could contain and dispense a sterile liquid into a syringe without the use of a needle. It would be even more useful if this device could be made simply, quickly and inexpensively. Moreover, it would be yet more useful if such a device could be made to be unitary and disposable. It would be yet more useful if the device could maintain the sterility of the liquid during dispensing into a syringe and to avoid the pre-injection of non-sterile air that is presently required for pressure equalization.

SUMMARY OF THE INVENTION

Briefly, therefore the present invention is directed to a novel vial for dispensing a liquid into a syringe, the vial comprising:

a body section for holding the liquid, the body section having a top and a bottom;

a port having a removable seal, where the port is adapted for a syringe connection and where the port is interconnected with the body section at a point near the top of the body section by a passageway which for at least a portion of its length extends above the level of the liquid in the body section when the vial is inverted, thereby preventing leakage of the liquid from the body section when the seal of the port is removed.

In a preferred embodiment, the vial further comprises a vent having a removable seal, where the vent is interconnected with the body section at a point on the body section that is above the level of the liquid when the vial is inverted.

The present invention is also directed to a novel method of making a vial for dispensing a liquid into a syringe, the method comprising:
  extruding a polymer into a blow mold;
  closing the mold;
  forming a vial comprising:
    a body section for holding the liquid, the body section having a top and a bottom;
    a port having a removable seal, where the port is adapted for a syringe connection and where the port is interconnected with the body section at a point near the top of the body section by;
    a passageway which for at least a portion of its length extends above the level of the liquid in the body section when the vial is inverted, thereby preventing leakage of the liquid from the body section when the seal of the port is removed;
  adding the liquid to the vial;
  sealing the vial; and
  removing the sealed vial from the mold.

Among the several advantages found to be achieved by the present invention, therefore, may be noted the provision of a vial or container that can contain and dispense a sterile liquid into a syringe without the use of a needle, and also the provision of such a vial that can be made simply, quickly and inexpensively, and also the provision of such a vial that is unitary and disposable, and also the provision of such a device that can maintain the sterility of the liquid during dispensing into a syringe and avoids the pre-injection of non-sterile air.

BRIEF DESCRIPTION OF THE DRAWINGS

FIG. 7A and FIG. 7B show front views of a vial of the present invention after removal of the seals of the port and the vent, where FIG. 7A shows the vial in upright position and FIG. 7B shows the vial in inverted position, and where both figures indicate the level of the liquid held in the vial before delivery to a syringe.

Corresponding reference characters indicate corresponding parts throughout the several views of the drawings.

DETAILED DESCRIPTION OF THE PREFERRED EMBODIMENTS

In accordance with the present invention, the inventors have discovered a novel vial that is useful for dispensing a liquid into a syringe. The vial comprises a body section for holding the liquid, the body section has a top and a bottom. The vial also provides a port that has a removable seal, where the port is adapted for a syringe connection and where the port is interconnected with the body section at a point near the top of the body section by a passageway which for at least a portion of its length extends above the level of the liquid in the body section when the vial is inverted, thereby preventing leakage of the liquid from the body section when the seal of the port is removed. The vial can also be provided with a vent that has a removable seal, where the vent is interconnected with the body section at a point on the body section that is above the level of the liquid when the vial is inverted.

It is a particularly useful feature of the vial that when the removable seal is removed from the port, the body of a syringe can be securely connected directly to the port. The vial and syringe can be inverted and the syringe filled in the same manner as is practiced with conventional septum-capped vials and syringes having needles attached. However, several advantages are provided by the novel device. When a vial with a vent is provided, there is no need to inject non-sterile air into the vial in order to equalize pressure prior to withdrawing liquid. Also, there is no need to use a needle on the syringe, thereby making the filling operation safer and saving the wear and tear and compromise of sterility of the needle that will be used for subcutaneous injection.

These and other features of the present invention will now be described with reference to the drawings that are a part of the specification.

Figure 1:
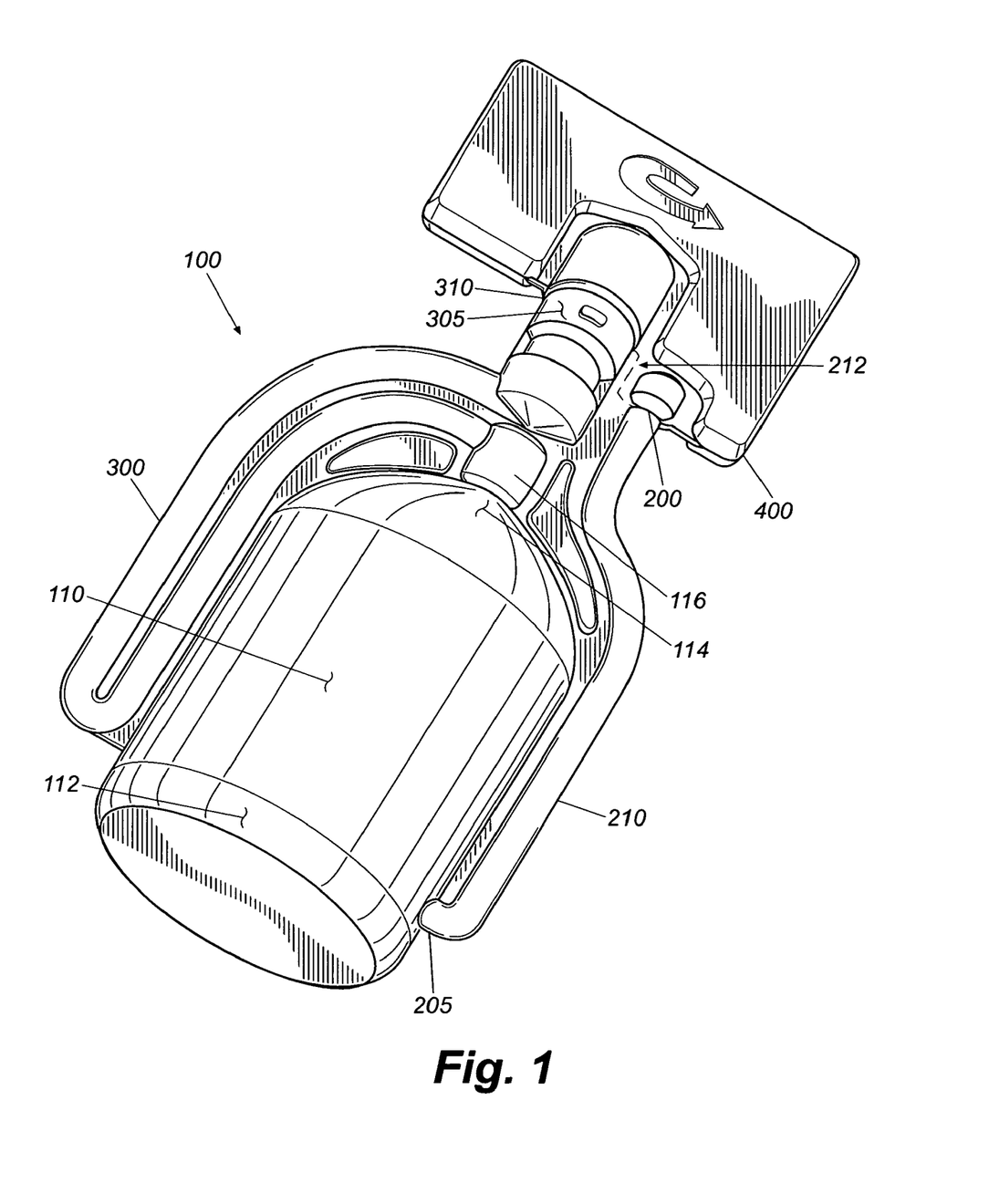
FIG. 1 is an isometric view of a vial of the present invention including an optional arrow on the tab to indicate opening technique.
Figure 2:
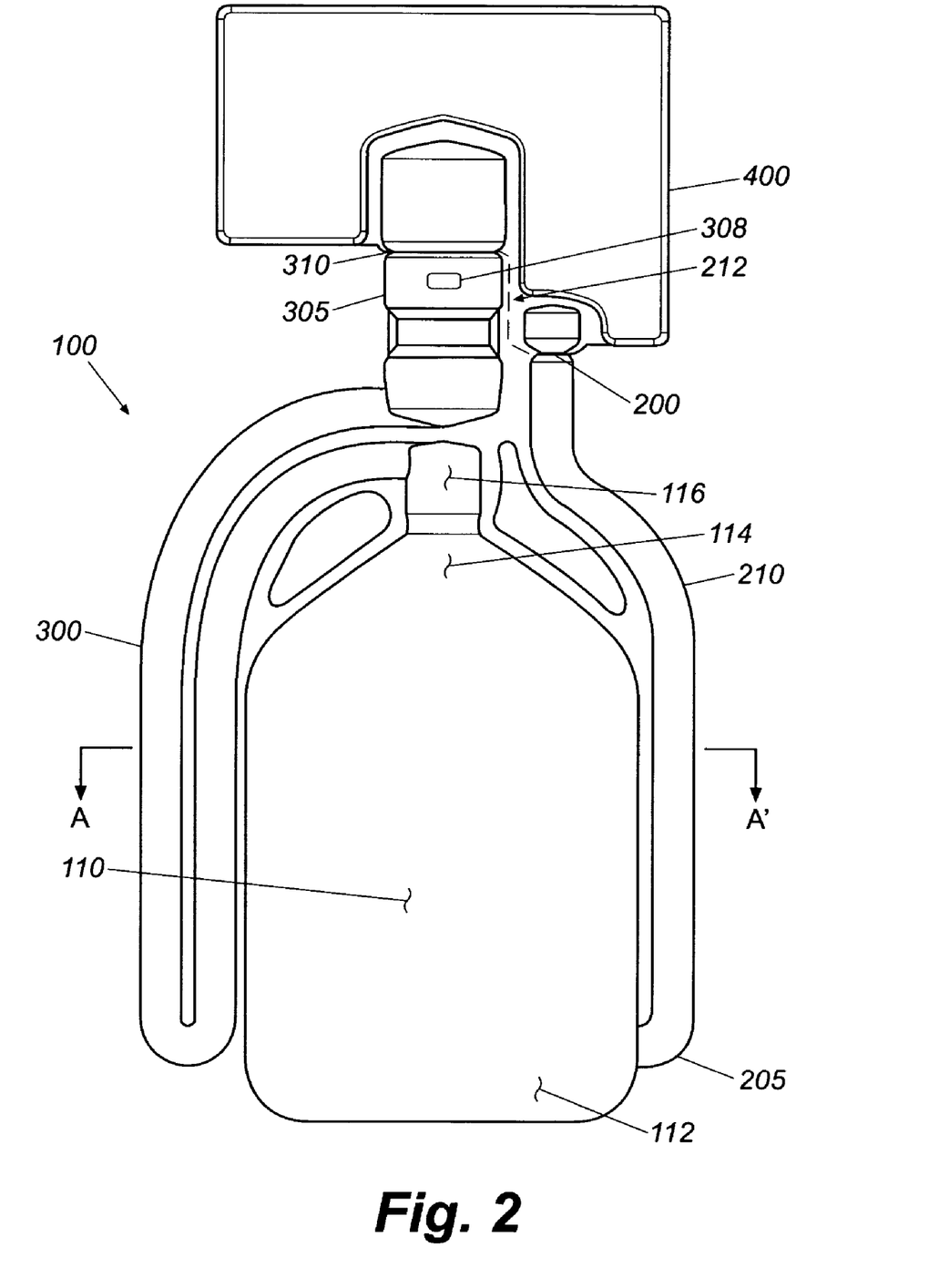
FIG. 2 is a front view of a vial of the present invention.
Figure 3:
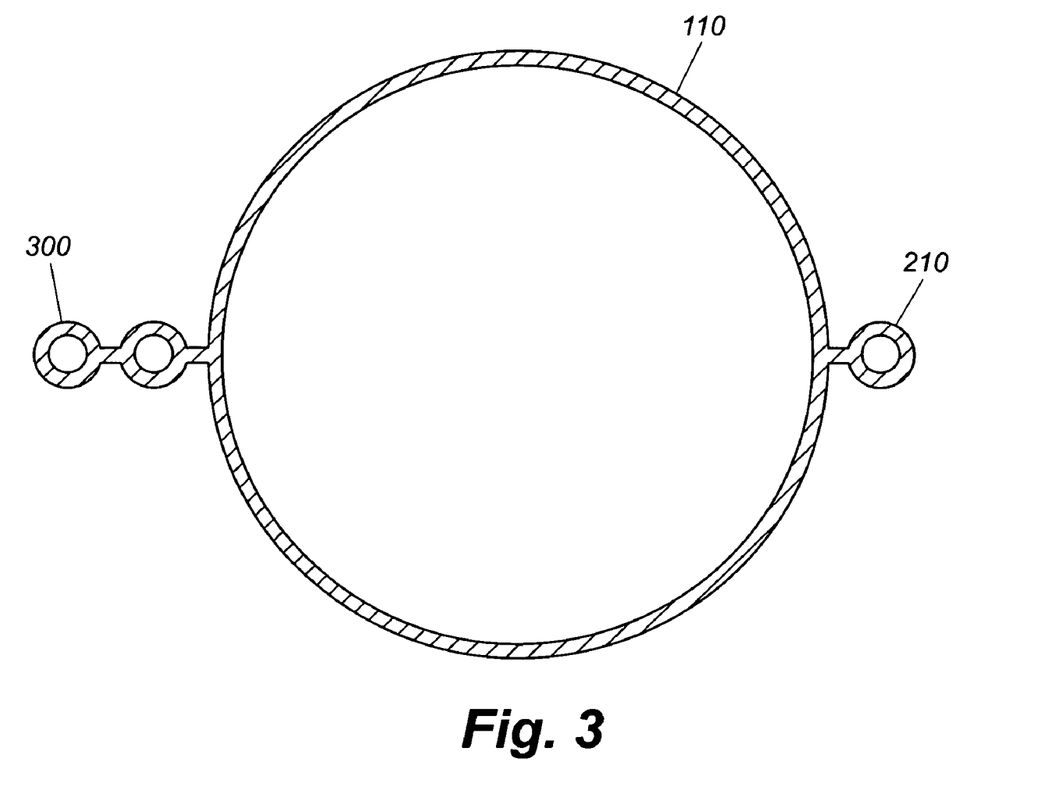
FIG. 3 is a cross-sectional view of a vial of the present invention through section AA' of FIG. 2.
Figures 4A, 4B:
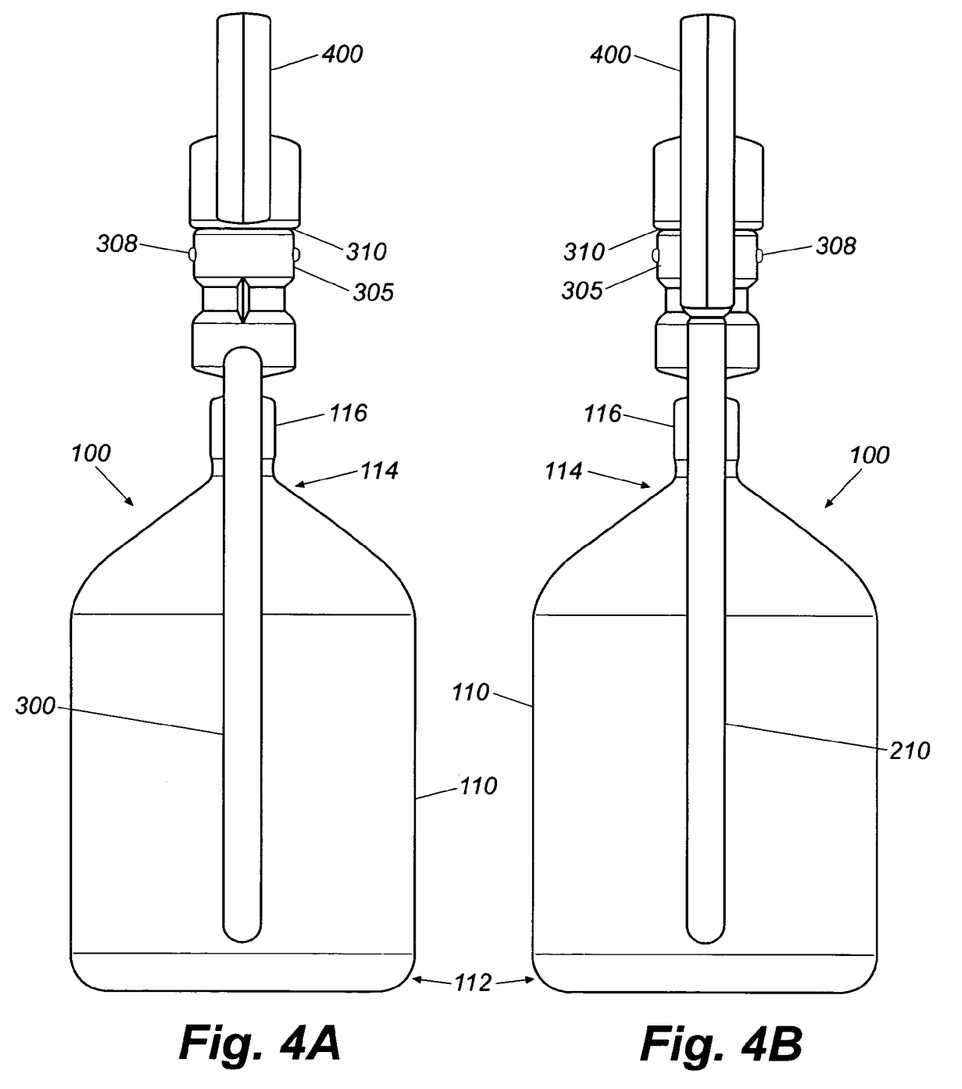
FIG. 4A is a left side view and FIG. 4B is a right side view of a vial of the present invention.
Figure 5A:
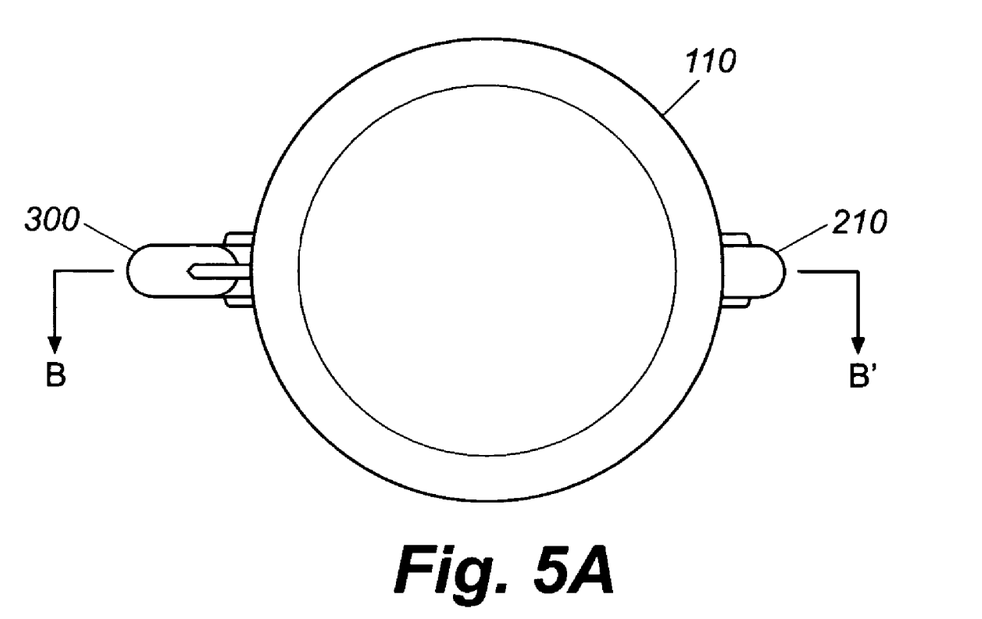
FIG. 5A is a bottom view and FIG. 5B is a top view of a vial of the present invention.
Figure 5B:
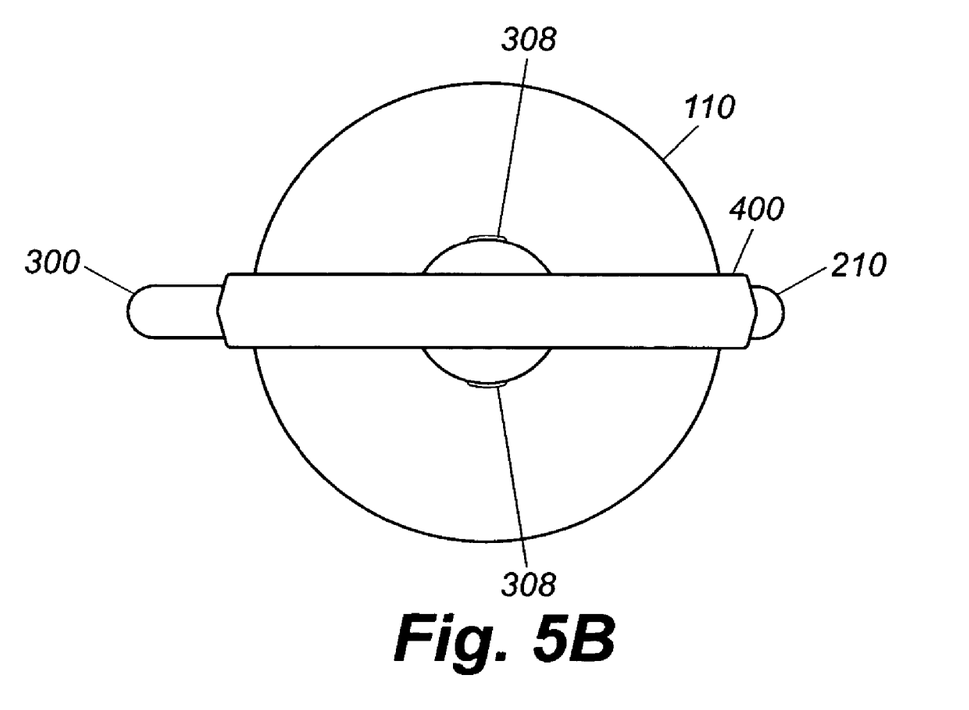

With reference to FIG. 1 and FIG. 2, the present vial [100] can generally be described as comprising a body section [110] for holding a liquid, the body section having a top [114] and a bottom [112]. Connected to the body section [110] is a port [305] having a removable seal [310]. The port [305] is adapted for a syringe connection and is interconnected with the body section [110] at a point near the top of the body section [114] by a passageway [300] which for at least a portion of its length extends above the level of the liquid in the body section [110] when the vial is inverted, thereby preventing leakage of the liquid from the body section when the seal [310] of the port is removed. It is preferred that the vial [100] also has a vent [200] having a removable seal, where the vent is interconnected with the body section [110] at a point on the body section [205] that is above the level of the liquid when the vial is inverted.

The body section [110] of the present vial serves as a reservoir for the liquid that can be contained in the vial. The body section [110] can be of almost any cross-sectional shape, such as round or circular, oval, triangular, square, rectangular, or irregular. A body section having a circular cross sectional shape is preferred and this shape is indicated in FIG. 1 through FIG. 8.

The body section [110] is described as having a top [114] and a bottom [112], for purposes of better describing the position of the vial during use, rather than identifying any specific point on the vial. The top of the body section [114] is any part of the body section that is located at or near what would normally be recognized as the top of the body section of the vial when the vial is sitting upright on its bottom. The general locations of the top [114] and the bottom [112] of the body section [110] of the present vial are indicated in FIG. 1, FIG. 2, FIG. 4A and FIG. 4B. In a preferred embodiment, the bottom of the body section is flat, whereby the vial can stand upright on a flat surface.

The body section [110] can enclose any volume. Commonly, however, the volume of the body section [110] is appropriate for holding the amount of liquid that would normally be used to fill a syringe. The liquid volume can range from about 1 ml to 100 ml, 250 ml, or even more. However, it is preferred that the volume of the body section [110] is appropriate for holding about 5 ml of liquid, or 10 ml, or 15 ml.

Figure 7A:
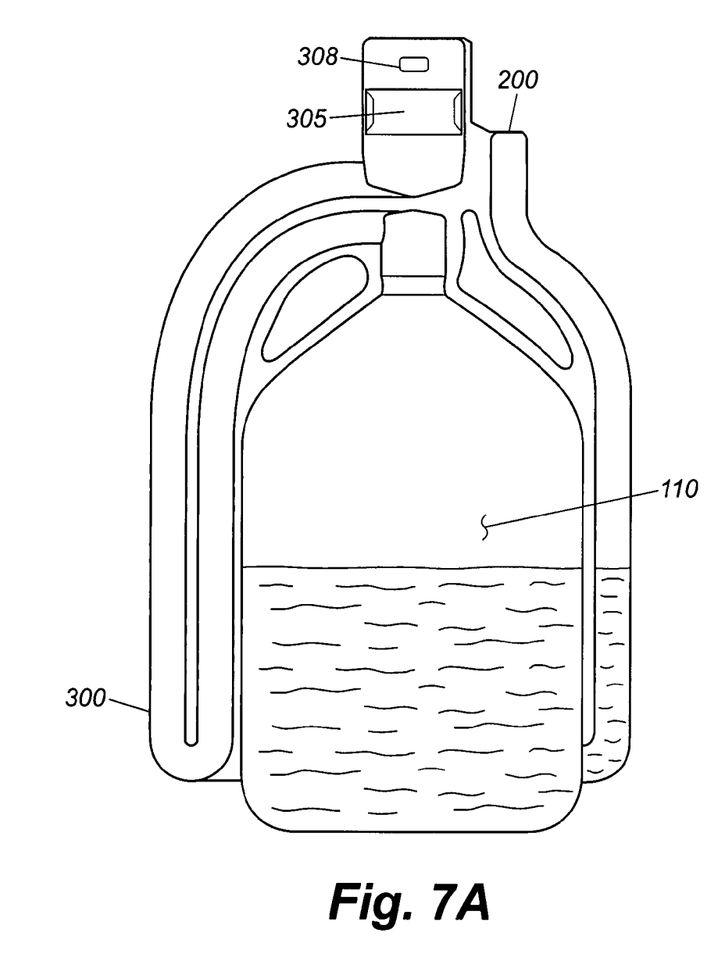
Figure 7B:
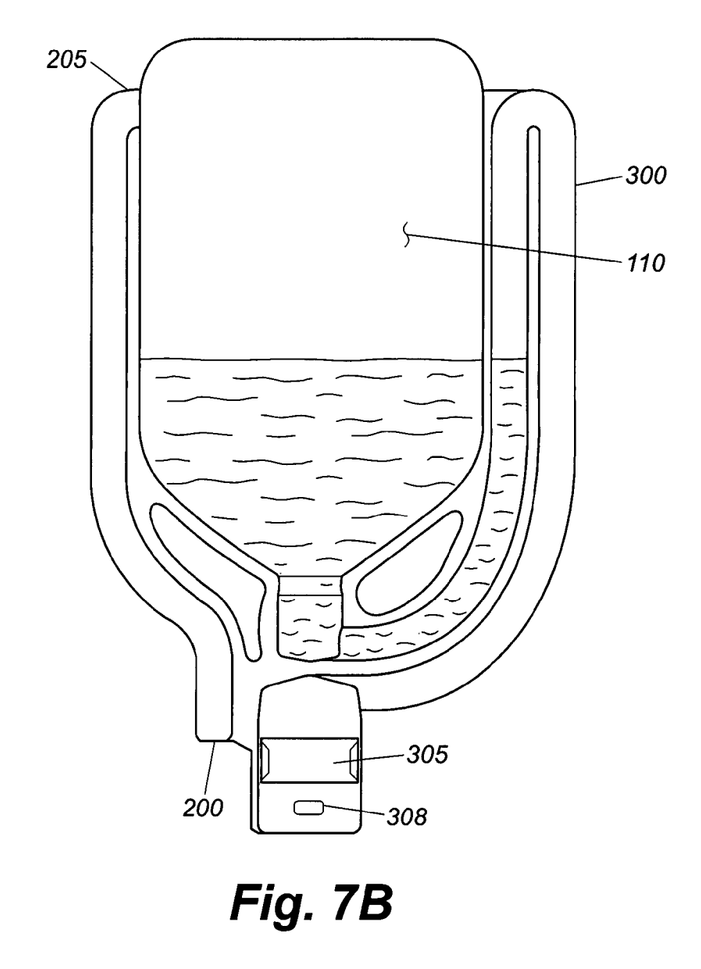
Figure 8:
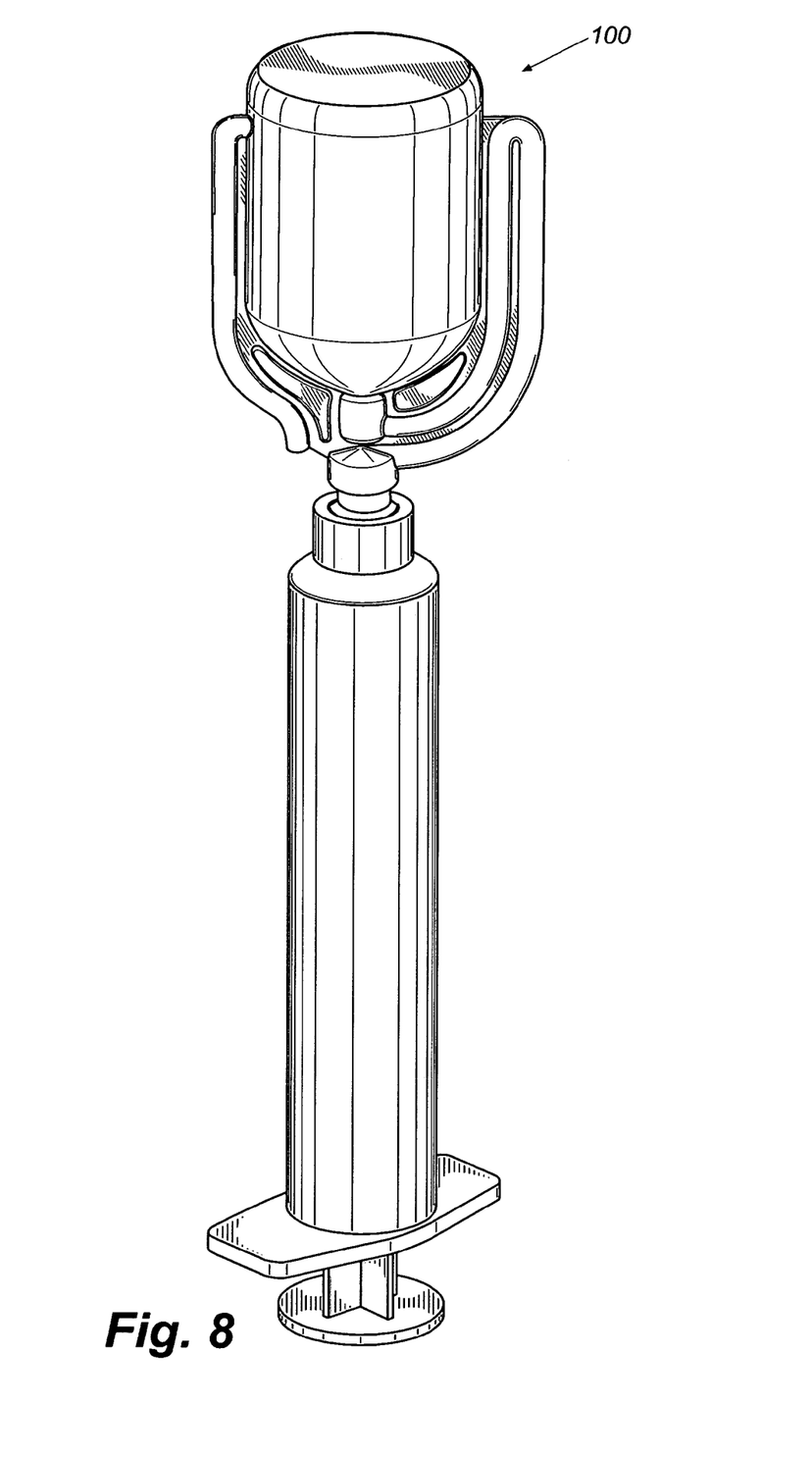
FIG. 8 is an illustration of a vial of the present invention after removal of the seals of the port and the vent and showing the vial in an inverted position and affixed to the body of a syringe.

It is generally preferred that the total volume of the body section [110] is greater than the volume of the liquid that is contained in the body section. In particular, it is preferred that the volume of the body section is sufficiently greater than the volume of the liquid that is contained therein so that when the vial is inverted, as shown in FIG. 7B and FIG. 8, for example, the level of the liquid in the body section is lower than the point on the body section where the vent is interconnected with the body section [205]. The preferred location of the interconnection of the vent with the body section [205] in relation to the liquid level in the vial when inverted is shown in FIG. 7B. In some embodiments, the volume of the body section [110] is about twice the volume of the liquid that is contained therein. In other embodiments, the volume of the body section is about one and one-half times the volume of the liquid.

It is preferred that the body section [110] has a portion that can act as a sump to gather the last drops of the liquid content of the vial when the vial is inverted and the liquid is withdrawn. Such a portion is located at or near the top of the body section and is indicated as [116] in FIG. 1, FIG. 2, FIG. 4A, FIG. 4B, and FIG. 6. As used herein, that portion will be referred to as a sump [116].

In order to avoid the need for the injection of air into the vial prior to withdrawal of liquid from the vial, the body section of the vial can be provided with a vent, that is described in more detail below, or the body section can be designed to be collapsible under the vacuum applied by the withdrawal of the plunger of a syringe, or to have collapsible sections that perform the same function.

A feature of the present vial [100] is a port [305] that is located at a level that is at or above the top of the body section [114]. It is preferred that the port [305] is located at a point that is near the top of the body section [114]. When it is said that the port [305] is near the top of the body section [114], it is meant that the port is located adjacent the top, or within about one inch of the top of the body section [114]. A preferred location for the port [305] is directly above the sump [116], as shown in FIG. 1, FIG. 2, FIG. 4A, FIG. 4B, FIG. 6, FIG. 7A and FIG. 7B.

The port [305] of the present vial [100] is fabricated with a removable seal [310]. The removable seal [310] can be any type of seal that hermetically seals the port when the seal is intact, but which can be removed or broken to expose the port [305] for connection to a syringe. A preferred type of removable seal [310] is a frangible web as can be formed during fabrication of the vial by glass blowing or blow molding. Frangible web seals are very thin sections of polymer or glass that retain seal integrity when intact, but which are sufficiently thin and fragile that they can be broken by the application of twisting or bending pressure—often by the pressure exerted by the fingers of a user. Such frangible web seals are well known in the art.

Figure 6:
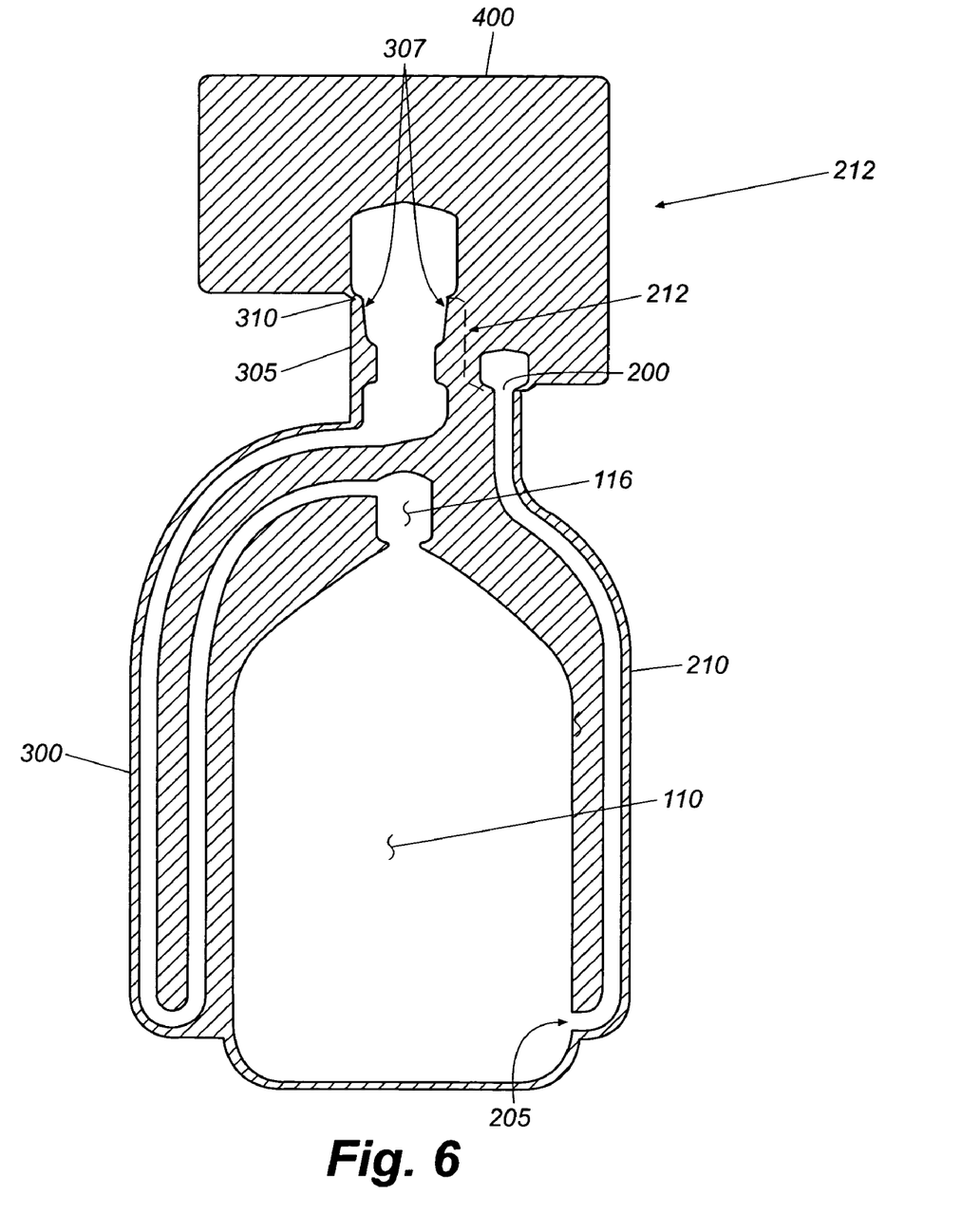
FIG. 6 is a cross-sectional view of a vial of the present invention through section BB' of FIG. 5A.

The port [305] is adapted for a syringe connection. By this it is meant that the port is formed in a shape that will accommodate either or both of a luer-type syringe fitting or a tapered plug or tapered tip type of fitting. While the removable seal [310] of the port [305], and the seal of the vent [200] are intact, the vial is hermetically sealed and maintains its original state of sterility or microbial integrity. If the vial was filled and sealed under sterile conditions, then it will maintain that sterility for as long as the seals of the port and vent remain unbroken. With reference to FIG. 6, it can be seen that all interior surfaces of the port [305] will likewise remain sterile while the seals are intact. In particular, the interior surface [307] of the port remains sterile. It is preferred that the interior surface of the port [307] is shaped as a slightly tapered conical segment to accept the center part of a male luer-type fitting when the port is exposed by removing the seal [310]. It is more preferred that the interior surface of the port [307] is shaped to accept either a luer-type fitting or a tapered plug friction type syringe fitting. When it is said that the interior surface of the port [307] is shaped to accept a syringe fitting, it is meant that the fitting is shaped to mate with and form a secure and waterproof seal with such a syringe fitting.

As used herein, the terms "luer syringe fitting", "luer fitting", "luer-type fitting", and the like, refer to a fitting for the connection of two articles in a secure and temporary fashion. The luer fitting is well known in the art and is commonly used to secure a needle to a syringe barrel. A luer-type fitting is composed of two parts, a male connector and a female connector. In some embodiments, the male luer connector can have a hub with bayonet-type slots or grooves that can mate with raised lugs [308] on the female part of the fitting. On a syringe, it is typical to have the male part of the luer fitting on the syringe barrel and the female part on the needle. "Luer-Lok" is a trademark of Becton, Dickinson and Company Corporation, Franklin Lakes, N.J. In the present vial, the port can have a luer-type fitting of either male or female design—whichever will successfully mate with the fitting on a syringe barrel or other device to which is desired to connect the vial. A preferred embodiment is to have the port designed in the form of a female luer fitting so that it can engage the male luer fitting of a syringe barrel. Optionally, the luer fitting of the port [305] can also have one or more lugs, or raised segments [308], which can mate with the channels or grooves of the hub of a male luer fitting.

The port [305] is interconnected with the body section [110] at a point near the top of the body section [114] by a passageway [300] which for at least a portion of its length extends above the level of the liquid in the body section [110] when the vial is inverted, thereby preventing leakage of the liquid from the body section when the seal [310] of the port is removed. With reference to FIG. 6, FIG. 7A, and FIG. 7B, the passageway [300] interconnects the port [305] with the body section [110] and serves as the conduit for the flow of the liquid from the body section to the port when the vial is used to fill a syringe. The passageway [300] can be of any shape or form, but is typically a tube or channel in a "U-tube" configuration as indicated in the present figures, for example. As illustrated in FIG. 7B, for example, a feature of the passageway [300] is that at least a portion of its length extends above the level of the liquid in the body section when the vial is inverted. This configuration serves to form a seal for the liquid when the vial is inverted, as shown in FIG. 7B, and prevents leakage or flow of the liquid from the vial when the seal of the port [310] is removed. However, when a syringe is connected to the port [305], as illustrated in FIG. 8, the liquid in the body section of the vial can easily be sucked through the passageway [300] from the vial to fill the syringe body when the plunger of the syringe is withdrawn.

Although the passageway [300] is shown in the present figures as being outside of the body section [110] and in a particular configuration, the passageway can be located inside or outside the body section, and can traverse almost any path from the port [305] to the sump [116] as long as it meets the criteria described above.

It is preferred that the present vial has a vent [200] having a removable seal, where the vent is interconnected with the body section at a point [205] on the body section that is above the level of the liquid when the vial is inverted. The location of the interconnection of the vent with the body section [205] is illustrated in FIG. 7B, for example, where it can be seen that the point of interconnection [205] is above the level of the liquid in the vial when the vial is inverted. This location prevents the leakage of liquid from the body section to the vent when the vial is inverted, such as for filling a syringe, and when the seal of the vent has been removed.

It is preferred that the vent [200] is located near the port [305] to facilitate fabrication of the vial and for other reasons that are described below. Since the port [305] is located at a level that is at or above the top of the body section [110] of the vial, the vent [200] will also normally be near the top of the body section [114]. This means that when the vial is inverted, as shown in FIG. 7B, the vent is located at a level that is below the level of the liquid in the body section. Because some small amount of liquid could have entered the channel [210] that interconnects the vent [200] with the body section [110] during filling, storage or handling of the vial, it is preferred that the vent [200] is sufficiently small that leakage of the liquid from the vent is prevented when the seal of the vent is removed. This can be accomplished in the present invention by making the opening of the vent small enough that when the seal of the vent is removed, the surface tension of the liquid, in combination with the contact angle of the liquid with the interior surface of the channel [210], prevents spontaneous leakage from the vent [200]. By way of example, when the vent [200] is circular in cross section, and the liquid has the surface tension characteristics of water, a vent having a diameter of not over 1.5 mm will prevent spontaneous leakage of liquid from the vent when the pressure inside the channel [210] at the vent [200] is 2 cm water head or less. When the pressure inside the channel [210] at the vent [200] is 5 cm water head or less, then a vent diameter of about 0.6 mm is required to prevent spontaneous leakage of liquid from the vent. Accordingly, it is preferred that the vent diameter is within a range of from about 0.1 mm to about 2 mm, a range of from about 0.5 mm to about 1.5 mm is more preferred, and a range of from about 0.6 mm to about 1.0 mm is yet more preferred.

As briefly discussed above, the vent [200] has a removable seal. It is preferred that the removable seal of the vent [200] is of the same type as the removable seal of the port [310]. It is preferred that the port having a removable seal and the vent having a removable seal each have a breakable seal comprising a frangible web.

When a frangible web is provided as a breakable seal, it is common to provide the seal with some type of attached tab or other gripping surface to facilitate the removal or breakage of the seal by a user. In the present invention, it is preferred that the breakable seal of the port [310] and the breakable seal of the vent [200] are connected to a tab [400] that provides an enlarged gripping surface for manually breaking the seals. While the seal of the vent [200] and the seal of the port [310] can be attached to separate tabs, it is preferred that they are attached to a common tab. An example of such a tab can be seen, for example, in FIG. 1 and FIG. 2. Any portion of polymer that extends between the tab [400] and the port [305] can have a thinner section [212] that interconnects the frangible web seal of the vent [200] and the frangible web seal of the port [310] in order to form a tear line, or weakened segment that will break or tear when the seals are broken to free the tab [400] from the port [305] and the vent [200]. This thinner section is illustrated in FIG. 2, for example, as the line denominated [212].

In the present invention, it is preferred that all parts of the vial are integral, or unitary. In other words, that all parts of the vial are formed from a single piece of the same material and all parts are interconnected until the removal of the tab [400] and seals. In a preferred embodiment, the body section [110], breakable seals and the tab of the vial [100] are unitary. It is more preferred that the vial [100] be formed from a single piece of polymer, such as by blow molding for example.

It is preferred that all parts of the present vial [100] are composed of one or more polymers. It is more preferred that all parts of the vial comprise the same polymer.

In an embodiment of the present vial, it is preferred that the polymer, and in particular, the polymer that comprises the body section [110], is sufficiently transparent or translucent that the amount of liquid in the body section can be determined visually. This feature is useful to permit quick visual determination whether the vial contains liquid and an indication of certain visual characteristics of the liquid, such as its color, clarity, viscosity, and the like.

In contrast, when the vial is used to contain a liquid that is sensitive to light, it is preferred that the polymer is opaque. Polymers can be made to be opaque by increasing their thickness, or by adding certain fillers or dyes.

It is also an embodiment of the present invention that the vial can be color coded to identify a property of the liquid in the body section. By way of example, the use of a red polymer for fabrication of the vial could be used to indicate toxic or other dangerous properties of the liquid contents. Other colors, such as green, blue, or the like, could be used to identify other characteristics of the liquid.

Also within the scope of the present invention is a vial that has been filled with a liquid. The vial comprises a body section which contains the liquid, the body section having a top and a bottom; a port having a removable seal, where the port is adapted for a syringe connection and where the port is interconnected with the body section at a point near the top of the body section by a passageway which for at least a portion of its length extends above the level of the liquid in the body section when the vial is inverted, thereby preventing leakage of the liquid from the body section when the seal of the port is removed. It is preferred that the vial has a vent having a removable seal, where the vent is interconnected with the body section at a point on the body section that is above the level of the liquid when the vial is inverted.

The present vial can be used to contain and dispense almost any liquid that is suitable for administration to a user. As the term "liquid", is used herein, it should be understood to include a clear liquid, a flowable paste, suspension, emulsion, micro-emulsion, or any other material having the general flow characteristics of a liquid. It is preferred that the viscosity of the liquid is from about 0.5 to about 10,000 centipoise, with a viscosity of from about 1.0 to about 1,000 centipoise being even more preferable.

The present vial is particularly useful for holding, storing, displaying, and dispensing a liquid for filling a syringe. In particular, it is useful for providing a measured amount of a liquid for transfer to a syringe. This feature is desirable for liquids such as drugs, neutraceuticals, vitamins, or medicines. Examples of liquids that can be delivered in the present vial include vitamins, over-the-counter drugs, and prescription drugs.

When a liquid is added to the body section [110] of the present vial, it is sometimes desirable, although not required, that the body section also contain a controlled type and/or amount of gas in the head-space. In some embodiments, it is desirable to control the type of gas that is added, such as, for example, when it is desirable to have an inert gas in the head-space. This can be done by controlling the type of gas that is added to the head-space during the fabrication and sealing of the vial.

Although the head-space gas, if one is used, can be almost any gas, it is preferred that the head-space gas comprises air, sterile air, oxygen gas, nitrogen gas, other inert gas, or a mixture thereof.

In order to prevent liquid expulsion when the vial is opened, it is preferred that the head-space gas is included in the body section at a pressure that is the same as or lower than the atmospheric pressure of the environment in which the vial is to be opened and used. Because a blow-fill-seal type of fabrication process is commonly carried out at a temperature that is above normal ambient temperature, it is preferred that sufficient amount of gas is added to the head-space during the filling and sealing process so that the sealed head-space of the vial is at or slightly below ambient pressure when the vial and its contents cool to a normal room temperature.

The present vial can be made by any method. However, it has been found that a preferred method for manufacturing the device is by blow-fill-seal technology. Information about blow-fill-seal technology can be found, for example, in Blow-Fill-Seal Technology, R. Oschmann et al., CRC Press, Boca Raton, Fla. (1999), or in Blow-Fill-Seal—Advanced Aseptic Processing, D. Jones, published in Encyclopedia of Pharmaceutical Technology, 2nd Ed., Marcel Dekker, Inc., New York, N.Y. (2002). Blow-fill-seal systems and equipment are available from several manufacturers, such as rommelag® USA, Inc., Edison, N.J. The operation of a blow-fill-seal system to form aseptic packages is well known in the art.

The present invention is also directed to a novel method of making a vial for dispensing liquid into a syringe, where the vial is pre-filled with a liquid. The method comprises: extruding a polymer into a blow mold; closing the mold; forming a vial comprising a body section for holding the liquid, the body section having a top and a bottom; adding the liquid to the body section of the vial; sealing the vial and forming a port having a removable seal, where the port is adapted for a syringe connection and where the port is interconnected with the body section at a point near the top of the body section by a passageway which for at least a portion of its length extends above the level of the liquid in the body section when the vial is inverted, thereby preventing leakage of the liquid from the body section when the seal of the port is removed; and removing the sealed pre-filled vial from the mold. In a preferred embodiment, the vial further comprises a vent having a removable seal, where the vent is interconnected with the body section at a point on the body section that is above the level of the liquid when the vial is inverted.

Almost any thermoplastic or thermoset polymer can be used for the production of the present vial. However, it is preferred that the polymer is one that can be extruded. Examples of polymers that are useful for the production of the present invention include, without limitation, polyethylene, polypropylene, ethyl vinyl alcohol copolymer, cyclic olefin copolymer, cyclic olefin polymer, liquid crystal polymer, polyethylene terephthalate, anhydride modified polyolefin, polycarbonate, polyacrylic, polyacrylonitrile, polyvinylchloride, polystyrene, a fluoropolymer, a thermoplastic polyester, nylon, or a mixture of any of these.

Examples of polymers that are preferred for use in the present device include low-density polyethylene, high-density polyethylene, linear low density polyethylene, medium density polyethylene, oriented polyethylene terephthalate, polyethylene terephthalate copolymer, anhydride modified ethylene vinyl acetate, anhydride modified low density polyethylene, anhydride modified linear low density polyethylene, polybutylene terephthalate, crystalline nylon, amorphous nylon, MXD6, or mixtures thereof. It is more preferred that the polymer from which the present device is made is low-density polyethylene, high-density polyethylene, medium density polyethylene, or polypropylene.

Polymers that are useful for the production of the present vial can also be intermixed with any type of additive that is typically used in polymer processing and which does not interact undesirably with the liquid. Additives such as: UV stabilizers, thermal stabilizers, processing aids, nucleating agents, clarifiers, and antistatic agents may be added to the resins above during the production of the container at any percent loading.

Polymers that are useful for the production of the present vial can be characterized by their melt index. As used herein, the terms "melt index" mean the number of grams of a polymer that can be forced through a 0.0825 inch orifice in 10 minutes at 190° C. by a pressure exerted by a mass of 2160 g (43.25 psi). In preferred embodiments, the polymer has a melt index between about 0.1 and 200 g/10 min and more preferred is a polymer having a melt index between about 0.1 to about 20 g/10 min. The melt index will depend on the particular polymer chosen in order to provide the container with the desired characteristics for its operating environment to allow successful transfer of any liquid contained therein.

In a preferred method, the polymer is extruded into the blow mold in the form of a parison. As used herein, the term "parison" means an extruded tube of plastic or polymer. Further preferred, is a method wherein the vial is formed from a single piece of polymer. However, the parison is optionally formed from a single polymer, a blend of two or more polymers, or a multilayer structure comprising two or more layers of the same or different polymers. The polymeric materials may be used as a single layer in a monolayer structure for the present vial, or as a layer in a multi-layer structure. The multi-layer structure may be manufactured using co-extrusion. The multi-layer structure may consist of any combination of polymers listed above and in any order and any frequency.

The step of forming the present vial can be accomplished by applying the mold around or onto the parison and applying a vacuum to the mold surface followed by the application of compressed gas or vacuum to the mold. In an embodiment of the present method, the step of closing the mold can form the removable seal of the port [310] and/or the removable seal of the vent [200] as well as the integral tab [400]. Alternatively, the step of closing the mold can seal one end of the body section [110] of the vial by forming a bottom [112] for the body section [110]. In other words, the closure of a first die can form either the top part of the vial or the bottom part of the vial. The liquid contents are then added to the body section, and closure of a subsequent die forms the completely sealed vial.

One feature of the present method is the control of the thickness of the walls of the body section [110] the passageway [300], the port [305], and the channel [210] to the vent [200].

The polymer is typically extruded from the outlet of an extruder at a temperature that is above its glass transition temperature and in the form of a parison. The polymer then enters the blow mold at or very near this temperature. It is preferred that the temperature of the polymer entering the blow mold is between about 50° C. and about 1000° C., more preferred is a temperature of between about 100° C. and about 500° C., and even more preferred is a temperature between about 100° C. and about 300° C. The exact temperature of the polymer entering the blow mold depends on the polymer chosen and the operating conditions and parameters of the molding and filling process.

As discussed above, the present method can also include the step of adding a head-space gas to the body section [110]. Although the gas can be added at any temperature, it is preferred that the head-space gas is added at a temperature of between about 10° C. and 500° C., preferably between about 100° C. and about 500° C., and even more preferably between about 100° C. and about 300° C.

When the liquid is added to the body section, it can be added at any temperature at which it is stable, but often the liquid is added to the vial at a temperature of from about 2° C. to about 65° C., and preferably from about 10° C. to about 50° C., and most preferably from about 15° C. to about 25° C.

The process may be carried out so that a sterile product is formed. For example, depending upon the sterility requirements of the liquid, the sterility of the liquid and gas in the body section can be closely controlled to yield a sterile charge in the body section.

When gas and/or liquid has been added to the body section, the vial can be sealed by the action of an additional die that closes to seal the container. Preferably this step can be used to form either the port and vent complete with seals and tab [400], or the bottom of the body section.

The molded, filled and sealed vial is allowed to cool in the mold sufficiently to retain its shape, and then the mold is opened and the pre-filled vial is removed. Any desirable printing, labeling, or other information that is to be added to the vial is then applied. When the vial is ready for use, it can be packaged for storage, shipment, sale and use.

The present vial is easily used by grasping the tab [400] and twisting or bending it to break the removable seal of the port [310], the removable seal of the vent [200], and to separate the tab [400] from the body of the vial at the tear line [212], removing the tab with remnants of the seals, and connecting a syringe body to the port [305], as shown in FIG. 8. The syringe and vial are inverted and the plunger of the syringe is then withdrawn to suck liquid from the body section, through the passageway [300] and into the syringe barrel. No vacuum is formed in the body section [110] due to the action of the vent [200] in allowing sufficient air to enter the body section to fill the void left by the withdrawn liquid. An advantage of the design features of the present vial is that there is never a need to bubble unsterile ambient air through the sterile liquid in the vial in order to equilibrate pressures, and the air that enters the vial through the vent [200] and channel [210] contacts only the surface of the sterile liquid, and then only after passing through the narrow confines of the channel, where microbes or other contaminants can contact and adhere to the walls of the channel [210] and never enter the body section [110] at all.

As discussed briefly above, information and labels regarding the contents of the vial can be placed anywhere on the vial. For example, a label can be applied to the outer surface of the body section [110], or to the tab [400]. Also, instructions for use of the vial can be placed on the vial or the tab. In one embodiment, as illustrated in FIG. 1, an arrow indicating a twisting motion could be printed on, or embossed into, the tab [400] to indicate to a user how the vial could be opened.

The specification, including the drawings, describes preferred embodiments of the invention. Other embodiments within the scope of the claims herein will be apparent to one skilled in the art from consideration of the specification or practice of the invention as disclosed herein. It is intended that the specification be considered to be exemplary only, with the scope and spirit of the invention being indicated by the claims.

All references cited in this specification, including without limitation all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results obtained.

As various changes could be made in the above methods and compositions by those of ordinary skill in the art without departing from the scope of the invention, it is intended that all matter contained in the above description and shown in the accompanying drawings shall be interpreted as illustrative and not in a limiting sense. In addition it should be understood that aspects of the various embodiments may be interchanged both in whole or in part.

What is claimed is:

1. A vial for dispensing a liquid into a syringe, the vial comprising:
   a body section for holding the liquid, the body section having a top and a bottom;
   a port having a removable seal, where the port is adapted for a secure syringe connection and where the port is interconnected with the body section at a point near the top of the body section by
   a passageway which for at least a portion of its length extends above the level of the liquid in the body section when the vial is inverted, thereby preventing leakage of the liquid from the body section when the seal of the port is removed;
   a sump for gathering the last drops of liquid content of the vial when the vial is inverted and the liquid is withdrawn; and
   a vent, wherein the vent is interconnected with the body section at a point on the body section that is above the level of the liquid when liquid is withdrawn and wherein the vent is located at a level that is below the level of the liquid in the body section when the liquid is withdrawn.

2. The vial according to claim 1, wherein the vent has a removable seal.

3. The vial according to claim 2, wherein the vent is sufficiently small that leakage of the liquid from the vent is prevented when the seal of the vent is removed.

4. The vial according to claim 2, wherein the port having a removable seal and the vent having a removable seal each have a breakable seal comprising a frangible web.

5. The vial according to claim 4, wherein the breakable seal of the port and the breakable seal of the vent are connected to a tab that provides an enlarged gripping surface for manually breaking the seals.

6. The vial according to claim 5, wherein the body section, breakable seals and the tab are unitary.

7. The vial according to claim 1, wherein the port is located at or above a point that is at approximately the same level as the top of the body section.

8. The vial according to claim 1, wherein the port is located above the top of the body section.

9. The vial according to claim 1, wherein the port is adapted for connection with a luer syringe fitting and/or a tapered plug syringe fitting.

10. The vial according to claim 1, wherein the port is adapted for connection with a luer syringe fitting.

11. The vial according to claim 1, wherein all parts of the vial are composed of one or more polymers.

12. The vial according to claim 11, wherein all parts of the vial comprise the same polymer.

13. The vial according to claim 11, wherein the polymer is sufficiently transparent or translucent that the amount of liquid in the body section can be determined visually.

14. The vial according to claim 11, wherein the polymer is opaque.

15. The vial according to claim 11, wherein the dispensing container is color-coded to identify a property of the liquid in the body section.

16. The vial according to claim 1, wherein the vial is formed from a single piece of polymer.

17. The vial according to claim 1, wherein the bottom of the body section is flat, whereby the vial can stand upright on a flat surface.

18. The vial according to claim 1, further comprising a liquid which fills a portion of the body section.

19. The vial according to claim 18, wherein the liquid comprises at least one material that is selected from vitamins, over-the-counter drugs, or prescription drugs.

20. The vial according to claim 1, wherein the body section has a volume of about 5 ml.

21. The vial according to claim 1, wherein the body section has a volume of about 10 ml.

22. The vial according to claim 1, wherein the body section has a volume that is greater than the volume of the liquid that is held in the body section.

23. The vial according to claim 22, wherein the body section has a volume that is approximately two times the volume of the liquid that is held in the body section.

* * * * *